United States Patent
Coe

(10) Patent No.: US 11,200,419 B1
(45) Date of Patent: *Dec. 14, 2021

(54) ENHANCED OBJECT STATE DISCRIMINATION FOR ROBOTS

(71) Applicant: X Development LLC, Mountain View, CA (US)

(72) Inventor: Sarah Coe, Mountain View, CA (US)

(73) Assignee: X Development LLC, Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/909,497

(22) Filed: Jun. 23, 2020

Related U.S. Application Data

(63) Continuation of application No. 16/016,251, filed on Jun. 22, 2018, now Pat. No. 10,733,445.

(51) Int. Cl.
*G06K 9/00* (2006.01)
*G06K 9/62* (2006.01)

(52) U.S. Cl.
CPC ....... *G06K 9/00664* (2013.01); *G06K 9/6201* (2013.01); *G06K 9/628* (2013.01)

(58) Field of Classification Search
CPC ........ G06K 9/00; G06K 9/6201; G06K 9/628; G05B 2219/35144; G05B 2219/39168; G05B 2219/39451; G05B 2219/39518; G05B 2219/40537; G05B 2219/50391
See application file for complete search history.

(56) References Cited

U.S. PATENT DOCUMENTS

| | | | |
|---|---|---|---|
| 6,889,118 B2 | 5/2005 | Murray et al. | |
| 7,801,644 B2 | 9/2010 | Bruemmer et al. | |
| 8,107,726 B2 | 1/2012 | Xu et al. | |
| 9,473,594 B1* | 10/2016 | Hickman | G06F 16/5866 |
| 10,733,445 B1 | 8/2020 | Coe | |
| 2009/0210090 A1 | 8/2009 | Takemitsu | |
| 2009/0234499 A1 | 9/2009 | Neilsen et al. | |
| 2011/0288684 A1 | 11/2011 | Farlow et al. | |
| 2012/0044265 A1* | 2/2012 | Khorashadi | H04W 4/024 |
| | | | 345/641 |
| 2012/0072023 A1 | 3/2012 | Ota | |
| 2014/0063055 A1* | 3/2014 | Osterhout | G06F 3/165 |
| | | | 345/633 |

(Continued)

OTHER PUBLICATIONS

Multi-Criteria Data Processing Algorithms for the Group of Surveillance Robots (Year: 2018).*

*Primary Examiner* — Nizar N Sivji
(74) *Attorney, Agent, or Firm* — Fish & Richardson P.C.

(57) ABSTRACT

Methods, systems, and apparatus, including computer-readable storage devices, for enhanced object discrimination by robots are described. In some implementations, a robot obtains image data from a camera of the robot, where the image data indicates a detected object. The robot classifies the object as having a particular object type based on the image data. The robot evaluates a current state of the object that includes a predetermined set of object state characteristics. The robot determines that a software application of the robot has indicated (i) an object type and (ii) one or more object state criteria that satisfy the current state of the detected object. The robot provides to the software application data indicating detection of the object and a position of the object.

20 Claims, 3 Drawing Sheets

(56) References Cited

U.S. PATENT DOCUMENTS

| | | | |
|---|---|---|---|
| 2014/0114845 A1* | 4/2014 | Rogers | G06Q 20/145 |
| | | | 705/39 |
| 2014/0163730 A1* | 6/2014 | Mian | B25J 9/16 |
| | | | 700/248 |
| 2017/0072563 A1 | 3/2017 | Anderson-Sprecher | |
| 2018/0018518 A1 | 1/2018 | Rajkumar | |
| 2018/0165518 A1 | 6/2018 | Assaf | |

* cited by examiner

ENHANCED OBJECT STATE DISCRIMINATION FOR ROBOTS

CROSS-REFERENCE TO RELATED APPLICATION

This patent application is a continuation (and claims the benefit of priority under 35 USC 120) of U.S. patent application Ser. No. 16/016,251, filed Jun. 22, 2018. The disclosure of the prior application is considered part of (and is incorporated by reference in) the disclosure of this application.

TECHNICAL FIELD

This disclosure relates generally to the discrimination of objects by robots.

BACKGROUND

Robots may be configured to interact with objects in their surroundings. In some situations, a robot may be configured to interact with an object determined to be in a particular state (e.g., a ball that is moving, or a device in a particular operating mode).

SUMMARY

In some implementations, an operating system of a robot includes an object recognition service that detects the presence and state of objects in the robot's surroundings. Each time a certain type of object is detected, the service determines whether the object exhibits any of multiple predetermined state characteristics (e.g., is it moving? is it within five feet of the robot? is it partially occluded? is it powered on or powered off?). The service allows third-party applications to access object state information, for example, through an application programming interface (API). Applications can receive a vector that indicates scores for the predetermined state characteristics, or the service can notify the application when the robot determines that an object has a desired combination of state characteristics. Individual applications can rely on the state analysis of the robot and do not need to directly assess image data or run their own state detection code. This arrangement increases computational efficiency of the robot by avoiding redundant image processing by multiple applications. Different applications do not need to separately process the same image data to determine whether the characteristics of interest to the application are present. The arrangement also improves efficiency by allowing applications to wait in a low-activity state until the service, rather than the applications, identifies an object with a particular combination of state characteristics.

The assessment of state characteristics by the object recognition service significantly improves the capabilities of a robot, allowing the operating system and individual applications to initiate robot actions conditioned upon specific object states being detected. As an example, for an object type "ball," potential state characteristics may include rolling, falling, being stationary, moving toward the robot, and moving away from the robot. Each time a ball is detected, the robot may determine whether each of those potential states describes the detected ball. A third-party application can condition a robot action on the detection of an object with a specific object type and a specific combination of the predetermined state characteristics. For example, the action of kicking is conditioned on detection of an object of type "ball" where the state includes both rolling and moving toward the robot.

In more detail, based on data collected from various sensors on the robot, the object recognition service determines and stores information related to one or more objects detected in the robot's surroundings. For each detected object, the service can store related object information in a data structure, where that information can include, for example, an object type (e.g., a ball, chair, a person, a cat), an object location, and/or an object identifier. The data structure can also store information related to a determined state of the object, such as an activity or motion of the object (e.g., rolling, at rest, moving to the right, walking, etc.), an orientation or posture of the object, or other state characteristics.

The object recognition service can provide a third party program access to detected object information through an API. For example, through the API, the third-party application may query the service to determine whether an object with a particular state has been detected in the robot's surroundings. If an object data structure matches the query, the service provides information related to the matching object to the program. In some implementations, the service may permit a third-party application to request notification from the service when an object of a particular type is later detected and determined to have a particular state (e.g., a particular combination of state characteristics). The service evaluates sensor data detected by the robot and notifies the application upon detecting the appropriate type of object in the particular state previously specified by the application. In response to the notification from the object recognition service, the third-party application can cause the robot to perform an action.

In some implementations, a method performed by a robot includes (i) obtaining image data from a camera of the robot, the image data indicating an object; (ii) classifying the object as having a particular object type based on the image data; (iii) in response to classifying the object as having the particular object type, evaluating a current state of the object, including determining, for each object state characteristic in a predetermined set of object state characteristics corresponding to the particular object type, a characteristic score indicating whether the object has the object state characteristic; (iv) determining that a software application of the robot has indicated (1) a first object type and (2) one or more object state criteria for the first object type; (v) determining that (1) the particular object type matches the first object type indicated by the application, and (2) the current state of the object satisfies the one or more object state criteria indicated by the application; and (vi) in response to determining that (i) the particular object type matches the first object type indicated by the application, and (ii) the current state of the object satisfies the one or more object state criteria, providing to the software application data indicating detection of the object and a position of the object.

In some implementations, the robot is configured to classify objects of different object types, where the different object types have different predetermined sets of object state characteristics. Here, the method can include determining, based on classifying the object as having the particular object type, the predetermined set of object state characteristics corresponding to the particular object type.

In some implementations, the object state characteristics indicate at least one of a magnitude of motion of the object, a direction of motion of the object, a type of motion of the object, an orientation of the object, an activity of the object, an operating condition of the object, a shape of the object, a color of the object, a size of the object, or a configuration of the object.

In some implementations, the robot determines that the current state of the object satisfies the one or more object state criteria indicated by the software application by determining that the characteristic scores for the object indicate that the object has a combination of object characteristics previously indicated by the software application.

In some implementations, the method performed by the robot also includes providing, to the software application, (i) image data for an image that includes the object and (ii) data indicating a bounding box indicating a region in the image where the object is located.

In some implementations, the method also includes providing, to the application, a vector that includes the characteristic scores for the object.

In some implementations, the robot obtains the image data by obtaining image data for a series of image frames and the method performed by the robot includes repeating, for each of the image frames or each of multiple groups of the image frames, operations including: (i) determining characteristic scores for the object for the predetermined set of object state characteristics; (ii) determining whether the characteristic scores satisfy the one or more object state criteria indicated by the application; and (iii) in response to determining that the characteristic scores satisfy the one or more object state criteria indicated by the application, providing, to the application, data indicating detection of the object and a position of the object.

In some implementations, a system includes one or more computers and one or more computer-readable media storing instructions that, when executed by the one or more computers, cause the one or more computers to perform the operations of the above-described method.

Certain implementations of the disclosed systems and techniques may have particular advantages. Because object detection is performed by a service available to multiple applications (e.g., provided by the robot's operating system), third-party applications do not need to individually process sensor data to identify objects in particular states, which reduces redundant processing and frees up processing capabilities for other tasks. The efficiency of the robot is also enhanced by the ability of the service to notify different applications of predetermined, application-specific object states (e.g., different combinations from among a predetermined set of object characteristics). Each individual application can specify the object types and object states that are applicable for the application, and then wait (e.g., in a low-activity state) or perform other tasks until the service sends a notification that a specified object type and object state has been identified.

The details of one or more implementations are set forth in the accompanying drawings and the description below. Other potential features and advantages of the disclosure will be apparent from the description, the drawings, and the claims.

BRIEF DESCRIPTION OF THE DRAWINGS

Like reference numbers and designations in the various drawings indicate like elements.

DETAILED DESCRIPTION

Figure 1A:
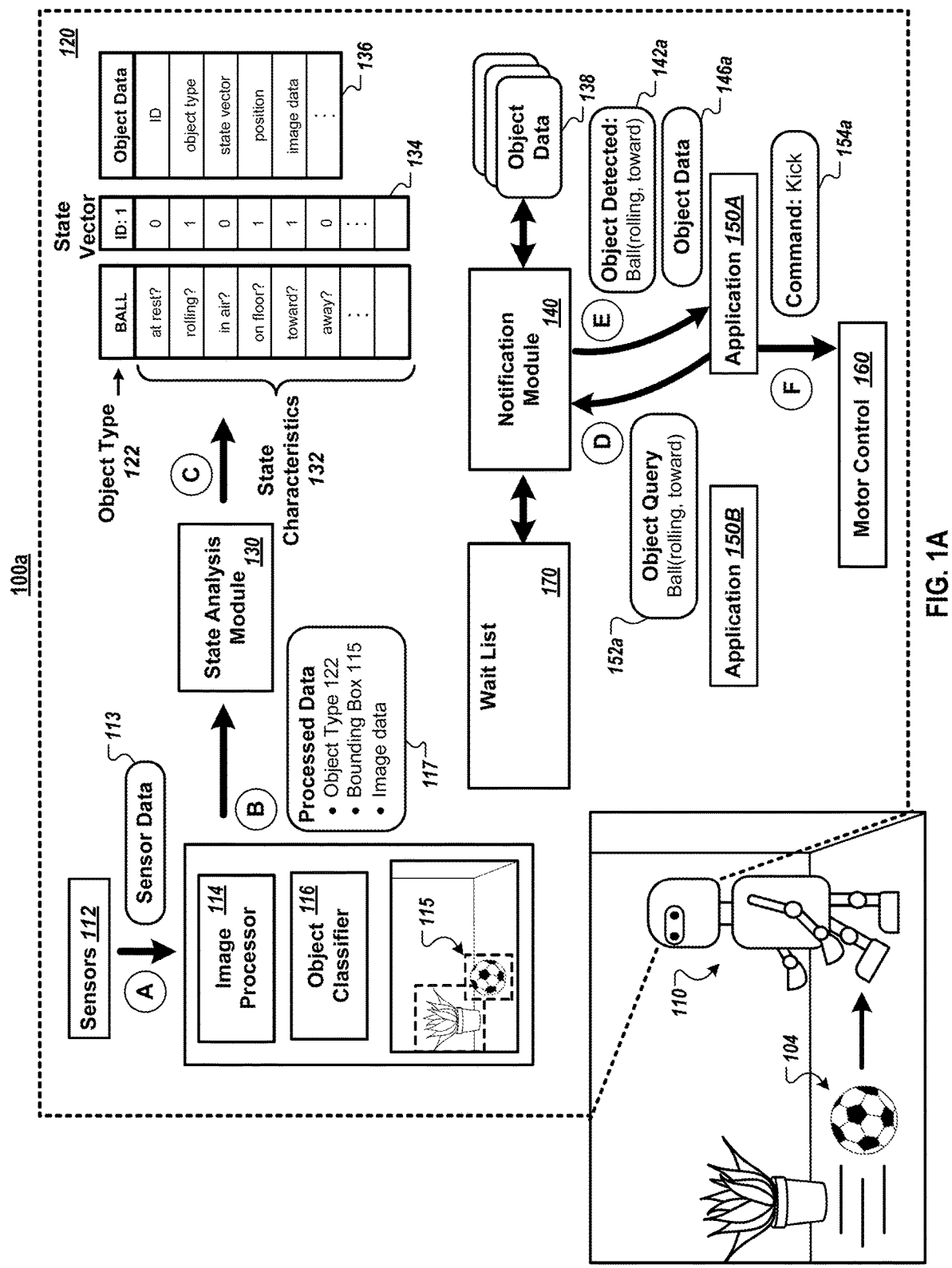
FIGS. 1A and 1B are diagrams illustrating examples of a system for enhanced object state discrimination for robots.

FIG. 1A is a diagram illustrating an example 100a of a system for enhanced object state discrimination for robots. In the system of FIG. 1A, a robot 110 includes a computer system 120 that processes data from sensors 112 of the robot 110 to detect the presence and state of objects in the robot's surroundings. For each detected object, the system 120 can generate and store an object data structure 136, which includes data describing the object, such as object type, location, position, or other data describing the observed state of the detected object. The system 120 makes the detected object data available to one or more third-party applications, 150A, 150B, through a notification module 140. By allowing the applications 150A, 150B to access the object detection and state information determined by the robot's computer system 120, the applications can use object data to induce robot operations without having to individually analyze sensor data or execute their own object state detection code.

In the example 100a, based on processing data from the robot's sensors 112, the robot's computer system 120 detects a soccer ball 104 rolling toward the robot 110. The computer system generates and stores an object data structure 136 indicating an object type "ball" with state characteristics including "rolling," "toward the robot 110," and "on the floor." The third-party application 150A, which is configured to cause the robot 110 to kick a motorized leg when it detects a ball rolling toward the robot 110, queries the notification module 140 for any detected objects of object type "ball" and state characteristics, "rolling" and "toward the robot 110." The notification module 140 returns the object data structure 136 corresponding to the rolling soccer ball 104 to the application 150A, which then issues one or more commands 154A to a motor control system 160 of the robot 110, where the commands 154A instruct the motor control 160 to kick a motorized robot leg. FIG. 1A includes stages (A) through (F) which represent a flow of data.

The robot 110 can be a machine or apparatus that includes one or more computer systems 120 enabling the robot 110 to autonomously or semi-autonomously interact with its surroundings. The robot's computer system 120 can include general-purpose hardware, such as one or more central processing units (CPU) or other general-purpose processor, one or more memory systems, as well as specialized computing hardware, such as one or more graphics processing units (GPUs), embedded processing systems, including field-programmable gate arrays, microcontrollers, application-specific integrated circuits (ASICs), or other specialized hardware. In some implementations, computing operations are performed by hardware physically resident in the robot 110, while in other implementations, the robot 110 may communicate with a remote computer system (e.g., a server system or a cloud computing platform) to perform computing operations.

The computer system 120 also includes software configured to perform computing operations for the robot. For example, the computer system 120 can include an operating system that manages hardware and software resources of the robot. The robot's operating system can include one or more services that perform particular computing operations or functions.

The robot 110 also includes various sensors 112. The sensors 112 can include, for example, one or more cameras, LIDAR systems, radar systems, proximity sensors, microphones, contact sensors, sonar systems, or other sensors that collect sensor data 113 related to the robot's surroundings. For example, the robot 110 may have one or more RGB-D cameras that collect image and/or video data that provide information related to objects present in the surroundings of the robot 110.

In stage (A), the robot 110 receives sensor data 113 from one or more sensors 112. In the example 100a, the robot 110 receives sensor data 113 that includes image and video data of a soccer ball 104 rolling toward the robot 110. The sensors 112 provide the sensor data 113 to the computing system 120, which processes the sensor data 113 to detect the presence of one or more objects in the robot's surroundings. Though the object in example 100a is an inanimate ball 104, the robot 110 may also detect the presence of animate objects in the robot's surroundings, for example, people, animals, or other robots.

In stage (B), the computer system 120 processes the image, video, or other sensor data 113 received from the robot's sensors 112 to detect and classify one or more objects in the robot's surroundings. In the system of FIG. 1A, the robot's computer system 120 includes an image processor 114 and object classifier 116 for detecting and classifying objects. The image processor 114 and object classifier 116 can be implemented in any of various configurations of hardware and/or software.

In example 100a, the image processor 114 analyzes the image and/or video sensor data 113 to detect an object. For example, the image processor 114 can apply edge detection or other processing techniques to identify and locate an object in the sensor data 113. In some examples, the image processor 114 may locate an object in the sensor data 113 by generating a bounding box 115 that defines the region of the image containing the identified object.

The image processor 114 can provide processed image data, generated bounding box data, or other processed or received information to the object classifier 116. Based on the data, the classifier 116 categorizes the detected object according to its object type 122 (e.g., a ball, a chair, a person, a cat, etc.).

In some examples, the object classifier 116 is implemented using one or more machine learning models. For example, the classifier 116 may be a neural network model, a regression model, or another computational model. The classifier 116 can be trained or adapted over time, e.g., using training data including labeled sensor or other data. In some examples, the classifier 116 processes the sensor data 112 to extract one or more features related to the detected object to classify the object. Based on the data, the object classifier 116 determines the object type 122 of the detected object. In the example 100a, the object classifier 116 determines that the object 104 is a "ball."

After analyzing the sensor data 113 to detect and classify the object, the image processor 114 and object classifier 116 can provide processed data 117 to a state analysis module 130, which determines the object's state. The state analysis module 130 is part of the computer system 120 and can be implemented in any combination of hardware and/or software.

The object's state can be specified by one or more state characteristics 132 that describe a current condition, status, or activity of the detected object. For example, the state characteristics 132 can include, for example, a location or position of an object (e.g., by a door, on a floor, on a table), a relative location of an object (e.g., within a certain distance of the robot 110), an orientation or posture of an object (e.g., facing the robot 110, laying on a side, sitting upright), an activity of an object (e.g., in motion, stationary, speaking, emitting a noise, gazing, walking to the right), or another object property. In some examples, one or more of the state characteristics 132 can indicate whether the object is a particular known object (e.g., a particular recognized person, animal, or other object).

In some implementations, different object types are described by different sets of state characteristics 132. For example, an object of type "ball" can have state characteristics 132 that indicate whether the ball is at rest, rolling, in the air, on the floor, directed toward the robot 110, directed away from the robot 110, as shown in the example 100a. An object of type "person" can have state characteristics 132 that indicate whether the person is facing the robot 110, walking towards the robot 110, gazing at the robot 110, or waving at the robot 110, or other fields. An object of type "robot" (e.g., the robot 110 has detected another robot in its surroundings) can have state characteristics 132 that indicate whether the other robot is powered on, facing the robot 110, partially occluded by another object, etc.

In stage (C), the state analysis module 130 analyzes the processed data 117 to determine one or more state characteristics 132 of the object. The processed data 117 provided to the state analysis module 130 can include, for example, the object type 122 of the detected object, a bounding box 115 associated with the object that indicates the object's location, as well as processed image data or other sensor data 113.

In some examples, the state analysis module 130 can implement a neural network or other machine learning model. The module 130 can process the data 117 to determine any of various state characteristics 132 of the object. For example, the module 130 may process video data to determine a speed for a moving object. If the classifier 116 determines that the detected object is a person, the module 130 may perform face or skeleton detection on the region of image data that corresponds to the detected person.

Based on analyzing the provided processed data 117, the state analysis module 130 determines a current state of the detected object. For example, the state analysis module 130 can determine a score for each of the state characteristics 132 corresponding to the object type 122 of the detected object. In some examples, the score for a state characteristic can be a binary value indicating whether the detected object exhibits that particular state (e.g., "1" if the object exhibits the characteristic, "0" if the object does not exhibit it). In some examples, the score can be a numeric value within a range of values that indicates a likelihood, or confidence, that the detected object exhibits the particular characteristic.

In some implementations, the state analysis module 130 generates a state vector 134 containing the scores for each of the state characteristics 132 of the detected object. In the system of FIG. 1A, the state analysis module 130 generates a state vector with binary values indicating whether the detected object exhibits the particular state characteristic. In the example 100a, the state analysis module 130 generates a state vector 134 indicating that the detected ball 104 exhibits the state characteristic 132 of "rolling," "on the floor," and "toward the robot 110."

The state analysis module 130 also generates an object data structure 136 that contains information describing the detected object. For example, the data structure 136 can include an object identifier (e.g., an identification number), the object type 122, a state vector of the object, a position of the object, a speed of the object, an activity of the object, or other date related to the object. The data structure 136 can also include one or more pointers or links indicating a memory storage location for sensor, image, or other data related to the object. In some examples, the data structure 136 may include processed image data, the object's bounding box 115, or other object-related data. In some examples, the data structure 136 may include data indicating that the object is a recognized object (e.g., a particular person).

The computer system 120 stores the object data structure 136 in a memory system of the robot 110. In some implementations, the computer system 120 may compile multiple object data structures 136 corresponding to different objects detected in the robot's surroundings into a collection of object data 138. The object data 138 can be stored in a memory system or database of the robot 110.

The system 120 can perform stages (A) through (C) for multiple objects detected from the sensor data 113. For example, in stage (A), the image processor 114 may detect multiple objects in the image data 113 received from the sensors 113. For each detected object, the system 120 may classify the object, determine an object type 122, determine state characteristics 132 for the object, and generate an object data structure 136 corresponding to the detected object. The system 120 can store the object data structures 136 in the collection of object data 138.

In some implementations, the computer system 120 repeats stages (A) through (C) at periodic intervals to update the object data 138 to reflect the current status of the robot's surroundings. For example, the system 120 can receive sensor data, process the data to detect and classify objects, and determine the detected objects' state characteristics at regular intervals (e.g., ten times per second). The system can update the object data 138 during each interval to represent the current state of the robot's surroundings. During an update, the system 120 can generate a new object data structure 136 corresponding to a previously-undetected object, delete an object data structure 136 corresponding to an object that is no longer detected, or modify an object data structure 136 corresponding to an object whose state characteristics 132 have changed since the last update.

The computer system 120 also includes a notification module 140. The notification module 140 can be, for example, a service of the system 120 that communicates with one or more third-party applications 150A, 150B. In some implementations, the notification module 140 includes an application programming interface (API) to provide the applications 150A, 150B access to detected object information analyzed and processed by the state analysis module 130.

In the example 100a, the computer system 120 includes the applications 150A, 150B. In some examples, the applications 150A, 150B are software applications written by one or more third-parties (e.g., third-party developers) that are run by an operating system of the robot 110. In some examples, the applications 150A, 150B can be stored in a memory system of the robot 110. The applications 150A, 150B may be configured to use and access various robot resources to cause the robot 110 to perform an operation or action. For example, the applications 150A, 150B can be configured to send one or more motor commands 154A to a motor control system 160 of the robot 110 (e.g., to cause the robot 110 to move from one location to another, to lift a motorized arm, or to move a motorized leg). The applications 150A, 150B can also be configured to use other resources of the robot 110 (e.g., a memory system, a communication system, a computing system, a sensor, an actuator, a motor system) to perform a particular computation; to generate, store, or transmit data; or to cause another operation or action of the robot 110 (e.g., activate a sensor, record data, use the robot's motor control).

In some examples, the applications 150A, 150B are configured to perform an operation conditioned on the detection of an object with a particular state in the robot's surroundings. For example, the applications 150A, 150B may cause the robot 110 to transmit a first audio greeting (e.g., say "hello") if a person (the object) is detected walking toward the robot 110 within five feet of the robot 110 (the particular state) and to transmit a second audio message (e.g., say "good-bye") if a person is detected walking away from the robot 110. In the example 100a, the application 150A is configured to command the robot 110 to kick a motorized leg on the condition that an object of type "ball" is detected to be rolling toward the robot 110.

Rather than directly analyzing the sensor data 113 to determine whether the particular condition is met, the application 150A can access the object data 138 analyzed by the state analysis module 130. The application 150A accesses the object data 138 by communicating with the notification module 140 API, which determines whether any of the objects currently detected in the robot's surroundings match the application's condition.

For example, in stage (D), the application 150A queries the notification module 140 by sending it an object query 152a. The object query 152a indicates the object sought by the application 150A by specifying an object type, as well as one or more particular state criteria of the object. In the example 100a, the application 150A sends the notification module 140 an object query 152a that specifies an object type "ball" with the state criteria of "rolling" and "toward the robot 110."

In stage (E), the notification module 140 compares the object type and state criteria of the query 152a to the object data 138 to determine whether any objects matching the criteria are currently detected in the robot's surroundings. If the notification module 140 identifies one or more detected objects that match the query 152a, it can send a message 142a to the application 150A indicating that the requested object was detected. The notification module 140 can also provide to the application 150A object data 146a corresponding to the one or more detected objects determined to match the object query 152a. In some examples, the object data 146a provided to the application 150A can be the object data structure 136 generated by the state analysis module 130. In some examples, the object data 146a can be a subset of the information contained in the data structure 136 (e.g., only the object identifier and the location of the detected object).

In some implementations, if the notification module 140 does not identify a detected object that matches the query 152a, it sends the application 150A a message indicating that no matching object is currently detected in the robot's surroundings.

In the example 100a, the notification module 140 compares the object query 152a (i.e., for a ball rolling toward the robot 110) to the object data 138 and determines that the robot 110 has, indeed, detected a ball rolling toward the robot 110 in its surroundings. As a result, the module 140 sends a message 142a to the application 150A indicating that a matching object is detected. The module 140 also provides to the application 150A object data 146a that includes the data structure 136 corresponding to the detected soccer ball 104.

In stage (F), the application 150A performs an operation or action based on determining that an object with a particular state is detected in the robot's surroundings. In the example 100a, the application 150A uses the object data 146a related to the soccer ball 104 to generate one or more commands 154a to cause the robot to kick a motorized leg to contact the ball. The application 150A sends the commands 154a to a motor control system 160 of the robot 110, which then executes the commands.

If the notification module 140 indicates that no matching object is currently detected, the application 150A can send the same object query 152a to the module 140 after a given time interval, querying whether the requested object is now detected. In some examples, the application 150A may continue to query the module 140 until the object indicated in the request is detected.

Figure 1B:
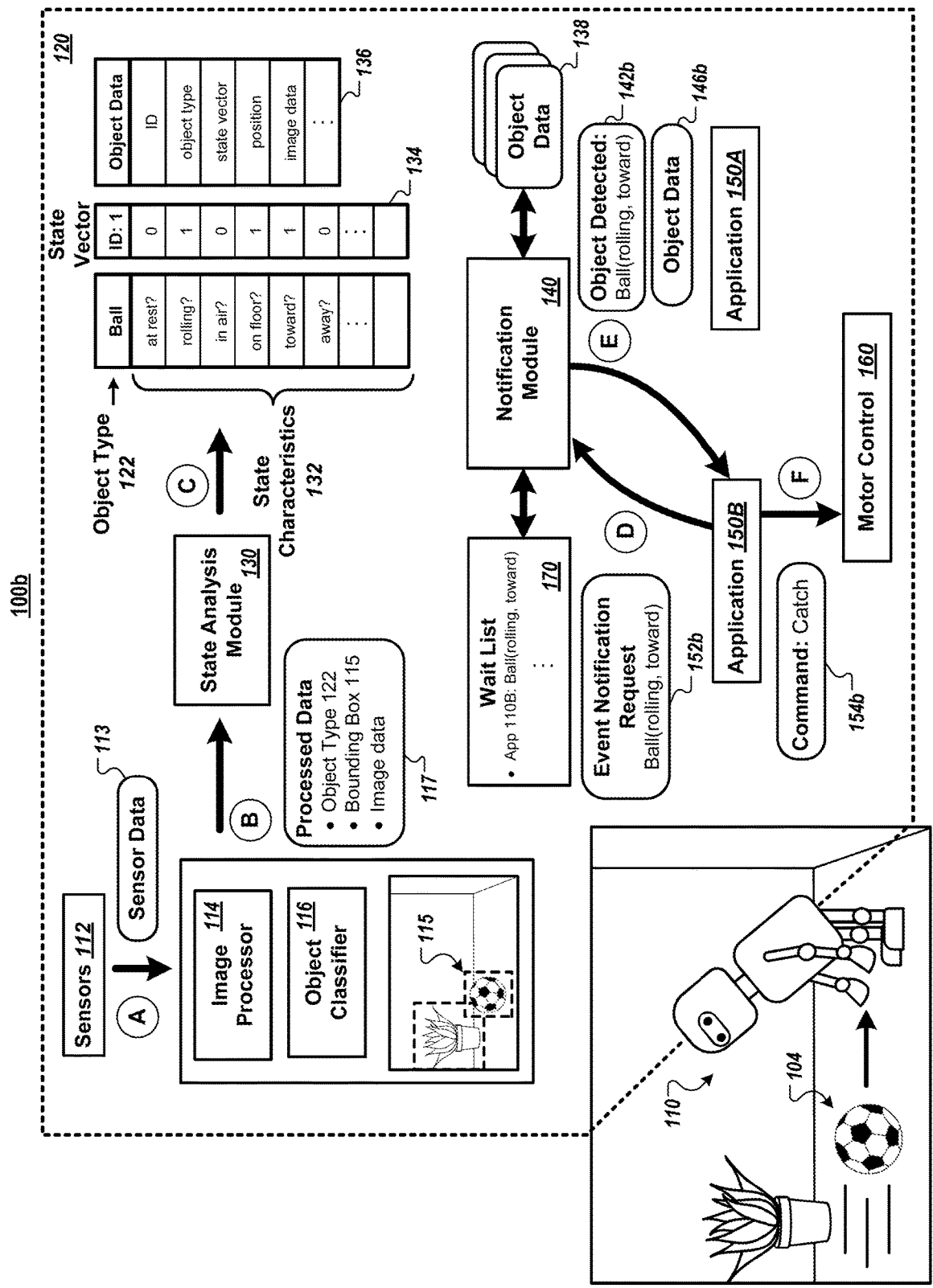

In some implementations, rather than regularly polling the notification module 140 to determine whether the object with particular state criteria is detected in the robot's surroundings, an application 150A, 150B can instead send an event request to the module 140, asking to be notified when the object is detected. FIG. 1B is a diagram illustrating an example 100b of a system for enhanced object state discrimination for robots in which the module 140 maintains a wait list 170 of pending object requests and provides a notification to the requesting application when the module 140 determines that the object with the particular state has been detected. FIG. 1B includes stages (A) through (F), which represent a flow of data.

FIG. 1B includes the same system of FIG. 1A, where the robot 110 includes the computer system 120 for detecting and classifying objects in the robot's surroundings. Similar to the example 100a, in stage (A) of the example 100b, the robot 110 receives sensor data 113 from sensors 112 of the robot 110 that includes image and video sensor data 113 indicating that the soccer ball 104 is rolling toward the robot 110.

In stage (B), using the image processor 114 and the object classifier 116, the system 120 detects the soccer ball 104, generates the bounding box 115, and identifies its object type 122 as "ball." The system provides the processed data 117, which includes the object type 122, the bounding box 115, and processed image data to the state analysis module 130.

In stage (C), the state analysis module 130 analyzes the data 117 to generate the state vector 134, which indicates that the detected ball 104 is rolling on the floor toward the robot 110. The analysis module 130 generates the object data structure 136, which includes data describing the detected ball 104, and stores the data structure 136 with the object data 138 in a memory system of the robot 110.

The system of FIG. 1B also includes an application 150B, which is a third-party software application configured to cause the robot 110 to catch a ball rolling toward it on the floor. In the example 100b, based on the condition that a ball is determined to be rolling toward the robot 110 on the floor, the application 150B generates motor commands 154b to cause the robot 110 to bend forward and extend its motorized arms to the floor to stop the motion of the rolling ball.

In stage (D), similar to the example 100a of FIG. 1A, rather than directly analyzing the received sensor data 113 to determine when the particular condition is met, the application 150B sends an event notification request 152b, which specifies a particular object type, as well as one or more particular state criteria of the object. In the example 100b, the application 150B sends the notification module 140 an event notification request 152b that specifies an object type "ball" with the state criteria of "rolling" and "toward the robot 110."

In stage (E), the notification module 140 compares the object type and state criteria of the notification request 152b to the object data 138 to determine whether any objects matching the criteria are detected in the robot's surroundings. If the notification module 140 identifies one or more detected objects that match the notification request 152b, it can send a message 142b to the application 150B indicating that the requested object was detected. The notification module 140 can also provide to the application 150B object data 146b corresponding to the one or more detected objects determined to match the object of the event notification request 152b.

However, unlike the example 100a, if the notification module 140 does not identify a detected object that matches the notification request 152b, it places the requested object of the event notification request 152b into a wait list 170. The wait list 170 maintains a list of pending requested objects from various applications 150A, 150B. In some implementations, the notification module 140 may place the object of event notification request 152b into the wait list 170 before comparing the requested object to the object data 138, as described above.

In the example 100b of FIG. 1B, each time the computer system 120 updates the object data 138, the notification module 140 can compare the requested objects pending in the wait list 170 to the detected objects described by the data 138. When the module 140 determines that a requested object on the wait list 170 has been detected, the module 140 can send a message 142b to the application that sent the notification request indicating the detection, as well as data 146b describing the detected object. By maintaining a wait list 170 of pending requested objects, the system 120 can reduce data traffic between the applications 150A,150B and the module 140 by eliminating the need for repeated object queries from an application while it is waiting for the detection of an object with particular state criteria.

In FIG. 1B, the application 150B had previously sent an event notification request 152b to the notification module 150 which it had placed in the wait list 170. In stage (E), after the computer system 120 updates the object data 138 to reflect the current state of the robot's surroundings, the module 140 compares the request in the wait list 170 with the objects described by the object data 138. The module 140 determines that a ball rolling toward the robot 110 has been detected, which matches the pending event notification request 152b in the wait list 170. As a result, the module 140 sends the message 142b to the application 150B indicating that the requested object has been detected. The module 140 also provides object data 146b to the application 150B, which can be the object data structure 136 corresponding to the detected ball 104 or a subset of the data contained in the structure 136.

In stage (F), the application 150B performs an operation or action based on determining that an object with the particular state is detected in the robot's surroundings. In the example 100b, the application 150B uses the object data 146b related to the soccer ball 104 to generate one or more commands 154b to cause the robot to bend forward and extend its motorized arms to stop the catch the ball 104. The application 150B sends the commands 154b to the motor control system 160 of the robot 110, which then executes the commands.

Figure 2:
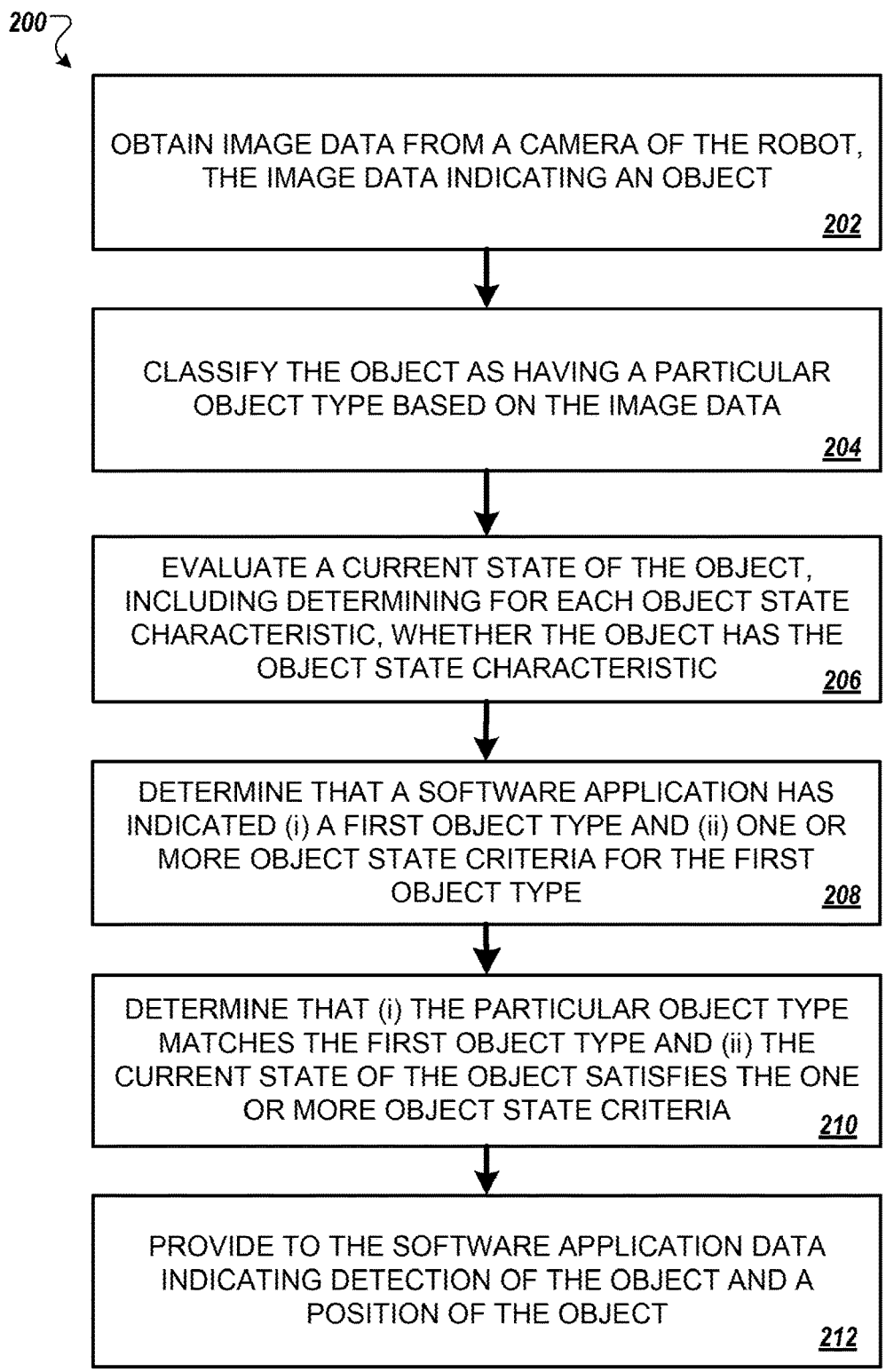
FIG. 2 is a flow diagram illustrating an example of a method for enhanced object state discrimination for robots.

FIG. 2 is a flow diagram illustrating an example of a method 200 for enhanced object state discrimination for robots. The method 200 can be implemented by one or more computer systems of a robot, for example, the computer system 120 of FIGS. 1A and 1B. Briefly, the method 200 includes obtaining image data from a camera of the robot, the image data indicating an object (202); classifying the object as having a particular object type based on the image data (204); evaluating a current state of the object, including determining for each object state characteristic in a predetermined set of object state characteristics corresponding to the particular object type, whether the object has the object state characteristic (206); determining that a software application of the robot has indicated (i) a first object type and (ii) one or more object state criteria for the first object type (208); determining that (i) the particular object type matches the first object type indicated by the application and (ii) the current state of the object satisfies the one or more object state criteria indicated by the application (210); and providing to the software application data indicating detection of the object and a position of the object (212).

In more detail, the method includes obtaining, by the robot, image data from a camera of the robot, the image data indicating an object (202). The camera can be, for example, a visible light camera, a monochrome camera, a RGB-D camera, an IR camera, or another imaging device that generates data based on the robot's surroundings. The camera can be mounted on the robot or physically integrated into the robot (e.g., integrated into the body of the robot). The image data provided by the camera indicates at least one object. For example, one or more pixels of an image provided by the camera may depict a particular object that is present in the robot's surroundings.

In some implementations, the robot may receive and process other sensor data that describe an object in the robot's surroundings. For example, the robot may receive LIDAR data, depth data (e.g., from a depth-sensing camera), radar data, proximity sensor data, and/or microphone data that indicate the presence of a particular object. The robot can receive and process any combination of sensor data to detect an object, to determine the object's type, and/or to determine the object's state characteristics.

The method further includes classifying the at least one object as having a particular object type based on the image data (204). For example, the robot may classify the object as "person," "television," "robot," "ball," or any of various object types.

In some implementations, the robot may classify the object using a machine learning classifier. For example, the computer system of the robot may include an image processor and an object classifier. The image processor analyzes the image data to detect an object within the image, for example, by applying edge detection or other image processing techniques. The object classifier then uses information from the image processor and/or the image data to classify the detected object as a particular object type. The classifier can include any of various machine learning models, such as a neural network model, a regression model, or another computational model. The classifier can be trained using labeled image data. In some implementations, the classifier is adapted over time (e.g., the classifier learns) to more accurately classify a detected object.

Each object type can have a different set of predetermined sets of object state characteristics that describe a current condition, status, or activity of the detected object. For example, the object state characteristics can indicate a magnitude of motion of the object, a direction of motion of the object, a type of motion of the object, an orientation of the object, an activity of the object, an operating condition of the object, a shape of the object, a color of the object, a size of the object, or a configuration of the object. For example, a typically stationary object such as a chair may have state characteristics that include a location (e.g., in the center of the room, five feet from the robot), an orientation (e.g., sitting upright) and a rotation (e.g., the seat facing toward the robot). A possibly mobile object such as a person may have state characteristics that include a location, a posture (e.g., standing), an orientation (e.g., facing the robot), an activity (e.g., walking toward the robot), and a direction of gaze (e.g., looking at the robot). In some cases, one or more of the state characteristics may indicate whether the object is recognized by the robot (e.g., a particular person recognized by the robot).

In response to classifying the object as having the particular object type, the robot can evaluate a current state of the object, including determining a characteristic score for each state characteristic in the predetermined set of state characteristics for the particular object type, where the characteristic score indicates whether the object has each state characteristic (206). For example, based on the particular object type determined by the classifier, the robot may determine a predetermined set of object state characteristics that correspond to the particular object type. The robot can then evaluate whether the detected object satisfies the object state characteristics by analyzing image data, sensor data (e.g., LIDAR or other sensor data), or other information related to the detected object (e.g., a bounding box of the object generated by an image processor, features of the detected object generated by the classifier or another computational module).

In some implementations, the score for a state characteristic may be binary (e.g., a "1" or a "0") indicating whether the object has that particular characteristic. In some implementations, the score for a state characteristic may represent a probability or likelihood that the detected object has the particular characteristic. In some implementations, the score for a state characteristic may indicate a value for that particular characteristic (e.g., a value of "1 ft/s" for the speed of an object, or a value of "green" for the color of an object). In some implementations, the robot may generate a vector that includes the characteristic scores for the detected object.

The method also includes determining, by the robot, that a software application for the robot has indicated (i) a first object type and (ii) one or more object state criteria for the first object type (208). The software applications may be, for instance, third-party applications that are designed to induce the robot to perform an action or execute a process when a particular object is detected in the robot's surroundings.

In some implementations, a software application provides to a computer system of the robot an object query or request, which indicates an object type and one or more state criteria for the indicated object type. For example, the robot may include a software application that is designed to wave the robot's arm when it detects a person approaching. The software application may provide the robot an object query indicating an object type "person" and the state criteria "walking toward the robot," querying the computer system whether any such matching object is detected in the robot's surroundings.

The robot can determine that a matching object is detected in the robot's surroundings by determining that (i) the particular object type matches the first object type indicated by the application and (ii) the current state of the object satisfies the one or more object state criteria indicated by the application (210). For example, the robot may determine that the current state of the object satisfies the one or more object state criteria by determining that the characteristic scores for the object indicate that the object has a combination of object characteristics previously indicated by the software application.

If the robot determines that a matching object is detected, the robot can provide to the software application data indicating detection of the object and a position of the object (212).

In some implementations, the robot compares an object query received from a software application to one or more objects presently detected in the robot's surroundings and informs the application whether or not a matching object is detected. In some implementations, the robot can store object queries received from one or more software applications in a wait list. The robot can then compare detected objects to the object queries in the wait list and notify the appropriate software application when the queried object is detected.

In some implementations, the robot may provide additional information related to a matching object to the requesting software application. For example, the robot can provide to the application the vector that includes the characteristic scores for the detected object, image data for an image that includes the object, data indicating a bounding box that surrounds the region in the image where the object is located, or other features or information related to the detected object.

In some implementations, there may be more than one detected object in the obtained image data and the robot may perform method 200 for more than one of the detected objects.

In some implementations, the image data obtained by the robot may include a series of image frames (e.g., a video) and the robot performs the method 200 on each frame or on a group of multiple frames, for instance, to detect a moving object. For example, for each frame or for each of multiple groups of frames, the robot can determine characteristic scores for the predetermined set of state characteristics for the detected object, then determine whether the characteristic scores satisfy the one or more object state criteria indicated by the application. If the robot determines that the characteristic scores satisfy the object state criteria indicated by the application, the robot can provide, to the application, data indicating detection of the object, a position of the object, and/or any other data related to the detected object.

The features described can be implemented in digital electronic circuitry, or in computer hardware, firmware, software, or in combinations of them. The techniques can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The machine-readable storage device may be a non-transitory machine-readable storage device. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a touch-screen and/or a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of the disclosure. For example, a social networking platform, rather than an external application, may perform employment analysis and provide employment information to users of the social networking platform. Accordingly, other implementations are within the scope of the following claims.

What is claimed is:

1. A method performed by one or more computing devices, the method comprising:
   obtaining sensor data from one or more sensors of a robot;
   recognizing an object based on the sensor data to determine an object type for the object;
   determining that the object type for the object matches a particular predetermined object type, wherein the particular predetermined object type is associated with one or more object state criteria that correspond to the predetermined object type;
   determining one or more object state scores indicative of a state of the object indicated by the sensor data;

determining, based on the object state scores, that the state of the object satisfies the one or more object state criteria that correspond to the particular predetermined object type; and providing data indicating detection of the object to a software module of the robot in response to (i) determining that the object type for the object matches a particular predetermined object type and (ii) determining that the state of the object satisfies the one or more object state criteria that correspond to the particular predetermined object type.

2. The method of claim 1, wherein providing the data indicating detection of the object comprises providing data indicating at least one of a location of the object, an object type for the object, or an indicator of the state of the object.

3. The method of claim 1, wherein determining the one or more object state scores comprises determining a score indicative of an orientation of the object; and
wherein determining that the state of the object satisfies the one or more object state criteria comprises determining that the score indicative of an orientation of the object satisfies a corresponding criterion.

4. The method of claim 1, wherein determining the one or more object state scores comprises determining a score indicative of movement of the object; and
wherein determining that the state of the object satisfies the one or more object state criteria comprises determining that the score indicative of movement of the object satisfies a corresponding criterion.

5. The method of claim 4, wherein determining the score indicative of movement of the object comprises determining a score that indicates a speed, direction, or type of movement of the object.

6. The method of claim 1, wherein the object is a person.

7. The method of claim 6, wherein determining one or more object state scores indicative of a state of the object comprises determining one or more scores indicative of a condition, status, or activity of the person.

8. The method of claim 6, wherein determining one or more object state scores indicative of a state of the object comprises determining a score that indicates at least one of:
a motion of the person,
a posture of the person,
an orientation of the person,
an activity of the person,
a direction of gaze of the person, or
whether the person is recognized by the robot.

9. The method of claim 1, wherein providing the data indicating detection of the object comprises providing a notification of an object meeting the object state criteria through an application programming interface.

10. The method of claim 1, wherein determining the one or more object state scores comprises determining, for each object state characteristic in a predetermined set of object state characteristics corresponding to the particular object type, a characteristic score indicating whether the object has the object state characteristic.

11. The method of claim 1, wherein the one or more computing devices are computing devices of the robot, such that the method is performed by the robot.

12. The method of claim 1, comprising:
storing data indicating different object types and object state criteria that are relevant to different software modules of the robot; and
selectively notifying the software modules of the robot of the presence of objects in an environment of the robot based on the stored data and (i) object types determined for the objects and (ii) object state scores determined for the objects,
wherein selectively notifying the software modules of the robot comprises providing the data indicating detection of the object to a particular software module for which the stored data designates that the particular predetermined object type and the one or more object state criteria that correspond to the particular predetermined object type are relevant to the particular software module.

13. A system comprising:
one or more computing devices; and
one or more machine-readable media storing instructions that, when executed by the one or more computing devices, cause the system to perform operations comprising:
obtaining sensor data from one or more sensors of a robot;
recognizing an object based on the sensor data to determine an object type for the object;
determining that the object type for the object matches a particular predetermined object type, wherein the particular predetermined object type is associated with one or more object state criteria that correspond to the predetermined object type;
determining one or more object state scores indicative of a state of the object indicated by the sensor data;
determining based on the object state scores, that the state of the object satisfies the one or more object state criteria that correspond to the particular predetermined object type; and
providing data indicating detection of the object to a software module of the robot in response to (i) determining that the object type for the object matches a particular predetermined object type and (ii) determining that the state of the object satisfies the one or more object state criteria that correspond to the particular predetermined object type.

14. The system of claim 13, wherein providing the data indicating detection of the object comprises providing data indicating at least one of a location of the object, an object type for the object, or an indicator of the state of the object.

15. The system of claim 13, wherein determining the one or more object state scores comprises determining a score indicative of an orientation of the object; and
wherein determining that the state of the object satisfies the one or more object state criteria comprises determining that the score indicative of an orientation of the object satisfies a corresponding criterion.

16. The system of claim 13, wherein determining the one or more object state scores comprises determining a score indicative of movement of the object; and
wherein determining that the state of the object satisfies the one or more object state criteria comprises determining that the score indicative of movement of the object satisfies a corresponding criterion.

17. The system of claim 13, wherein the system is the robot and the one or more computing devices are computing devices of the robot.

18. The system of claim 13, wherein the operations comprise:
storing data indicating different object types and object state criteria that are relevant to different software modules of the robot; and
selectively notifying the software modules of the robot of the presence of objects in an environment of the robot based on the stored data and (i) object types determined for the objects and (ii) object state scores determined for the objects, wherein selectively notifying the software modules of the robot comprises providing the data indicating detection of the object to a particular software module for which the stored data designates that the particular predetermined object type and the one or more object state criteria that correspond to the particular predetermined object type are relevant to the particular software module.

19. One or more non-transitory computer-readable media storing instructions that, when executed by one or more computing devices, cause the one or more computing devices to perform operations comprising:

- obtaining sensor data from one or more sensors of a robot;
- recognizing an object based on the sensor data to determine an object type for the object;
- determining that the object type for the object matches a particular predetermined object type, wherein the particular predetermined object type is associated with one or more object state criteria that correspond to the predetermined object type;
- determining one or more object state scores indicative of a state of the object indicated by the sensor data;
- determining based on the object state scores, that the state of the object satisfies the one or more object state criteria that correspond to the particular predetermined object type; and
- providing data indicating detection of the object to a software module of the robot in response to (i) determining that the object type for the object matches a particular predetermined object type and (ii) determining that the state of the object satisfies the one or more object state criteria that correspond to the particular predetermined object type.

20. The one or more non-transitory computer-readable media of claim 19, wherein the operations comprise:

- storing data indicating different object types and object state criteria that are relevant to different software modules of the robot; and
- selectively notifying the software modules of the robot of the presence of objects in an environment of the robot based on the stored data and (i) object types determined for the objects and (ii) object state scores determined for the objects,
- wherein selectively notifying the software modules of the robot comprises providing the data indicating detection of the object to a particular software module for which the stored data designates that the particular predetermined object type and the one or more object state criteria that correspond to the particular predetermined object type are relevant to the particular software module.

\* \* \* \* \*